United States Patent [19]

Knudson, Jr. et al.

[11] Patent Number: 5,160,454

[45] Date of Patent: * Nov. 3, 1992

[54] PROCESS FOR MANUFACTURING ORGANOCLAYS HAVING ENHANCED GELLING PROPERTIES

[75] Inventors: Milburn I. Knudson, Jr., Gonzales, Tex.; Thomas R. Jones, Cornwall, England

[73] Assignee: Southern Clay Products, Inc., Gonzales, Tex.

[*] Notice: The portion of the term of this patent subsequent to May 12, 2004 has been disclaimed.

[21] Appl. No.: 48,033

[22] Filed: May 11, 1987

Related U.S. Application Data

[63] Continuation-in-part of Ser. No. 771,477, Sep. 3, 1985, Pat. No. 4,664,842, which is a continuation of Ser. No. 561,052, Dec. 12, 1983, abandoned, which is a continuation-in-part of Ser. No. 193,636, Oct. 3, 1980, abandoned.

[51] Int. Cl.$^5$ ............................................. B01J 13/00
[52] U.S. Cl. ................................. 252/315.2; 44/270; 252/28; 556/173
[58] Field of Search ................... 252/315.2, 28; 44/7.6, 44/270; 556/173

[56] References Cited

U.S. PATENT DOCUMENTS

| | | | |
|---|---|---|---|
| 3,889,931 | 6/1975 | Adams | 252/313.1 |
| 3,951,850 | 4/1976 | Clocker et al. | 252/313.1 |
| 3,974,125 | 8/1976 | Oswald et al. | 523/216 |
| 4,040,974 | 8/1977 | Wright et al. | 252/315.2 |
| 4,664,842 | 5/1987 | Knudson, Jr. et al. | 252/315.2 |
| 4,695,402 | 9/1987 | Finlayson et al. | 252/315.2 |

FOREIGN PATENT DOCUMENTS 1439828  6/1976  United Kingdom.

OTHER PUBLICATIONS

"Chemical Engineers' Handbook", Edited By R. H. Perry et al., 5th Edition, 1973, McGraw-Hill Book Co., pp. 8-42 and 8-43.

*Primary Examiner*—Richard D. Lovering
*Attorney, Agent, or Firm*—Klauber & Jackson

[57] ABSTRACT

An improvement is disclosed for use in the process wherein an organophilic clay is manufactured by reacting a smectite-type clay with a higher alkyl-containing quaternary ammonium compound. According to the improvement of the invention, the gelling properties of the resulting organoclay are enhanced, by subjecting the clay as a pumpable slurry, to high-speed fluid shear, prior to the reaction thereof with the ammonium compound.

2 Claims, 3 Drawing Sheets

EFFECT OF TREATMENT OF REFINED BENTONITE SLURRY BY INVENTION. VISCOSITY MEASURED IN ODORLESS MINERAL SPIRIT GEL.

EFFECT OF TREATMENT OF REFINED BENTONITE SLURRY BY INVENTION. VISCOSITY MEASURED IN DIESEL FUEL GEL.

EFFECT OF TREATMENT OF REFINED BENTONITE SLURRY BY INVENTION. VISCOSITY MEASURED IN ODORLESS MINERAL SPIRIT.

EFFECT OF TREATMENT OF REFINED BENTONITE SLURRY BY INVENTION. VISCOSITY MEASURED IN TOLUENE GEL.

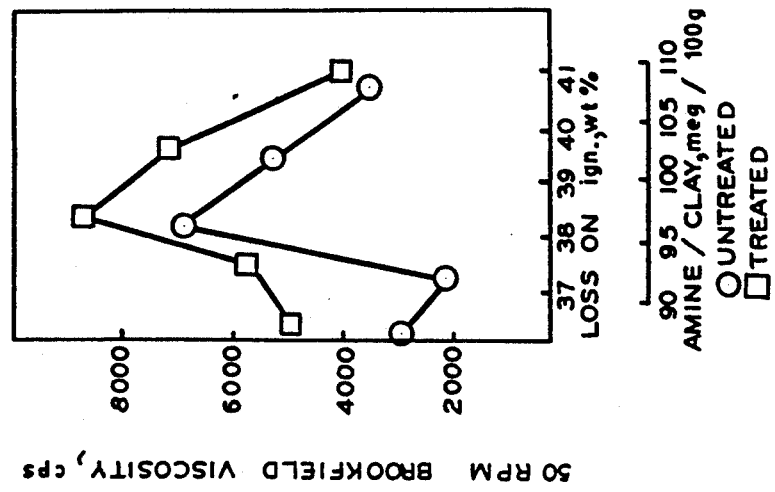
FIG. 7 EFFECT OF TREATMENT OF REFINED BENTONITE SLURRY BY A ROTOR/STATOR MIXER. VISCOSITY MEASURED IN ODORLESS MINERAL SPIRIT.
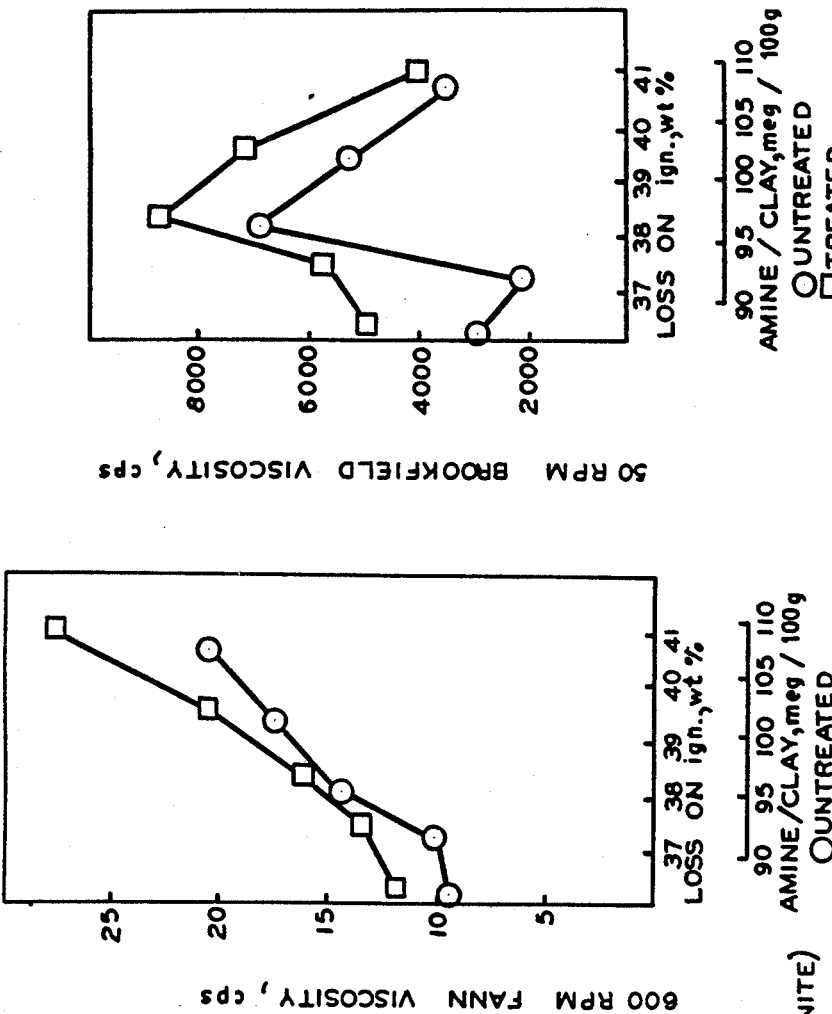
FIG. 6 EFFECT OF TREATMENT OF REFINED BENTONITE SLURRY BY A ROTOR/STATOR MIXER. VISCOSITY MEASURED IN DIESEL FUEL.
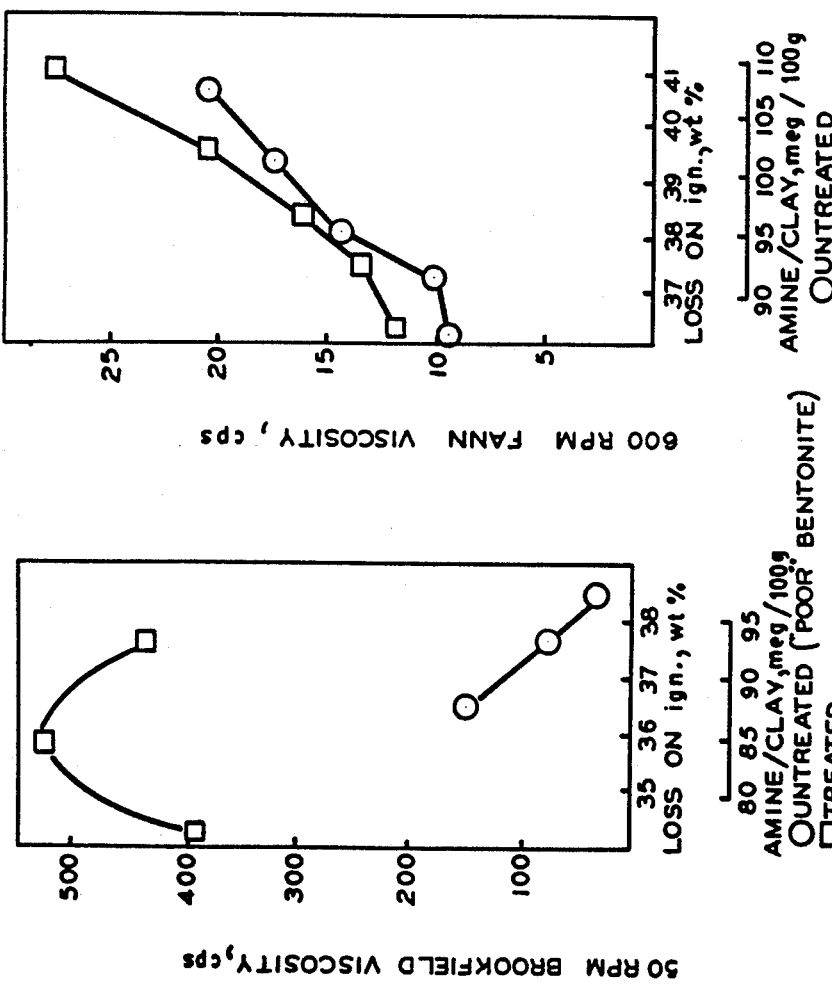
FIG. 5 EFFECT OF TREATMENT OF REFINED BENTONITE BY INVENTION. VISCOSITY MEASURED IN TOLUENE GEL.

PROCESS FOR MANUFACTURING ORGANOCLAYS HAVING ENHANCED GELLING PROPERTIES

This application is a continuation-in-part of our copending application Ser. No. 771,477 filed Sept. 3, 1985, now U.S. Pat. No. 4,664,842 which is a continuation of Ser. No. 561,052 filed Dec. 12, 1983, filed Oct. 3, 1980, now abandoned.

BACKGROUND OF THE INVENTION

This invention relates generally to organophilic clays (hereinafter referred to as "organoclays"), and more specifically relates to an improved process for manufacture of same, which process strikingly enhances the gelling properties of the said products.

Organoclays, representing the reaction product of a smectite-type clay with a higher alkyl-containing quaternary ammonium compound, have long been known for use in gelling of organic liquids such as lubricating oils, linseed oil, toluene and the like. A large variety of highly useful products, such as lubricating greases are producible through use of such gelling agents. The procedures and chemical reactions pursuant to which these organoclays are prepared, are well-known. Thus, under appropriate conditions, the organic compound which contains a cation, will react by ion exchange with clays which contain a negative layer lattice an exchangeable cations to form the organoclay products. If the organic cation contains at least one alkyl group containing at least 10 carbon atoms, then the resultant organoclays will have the property of swelling in certain organic liquids.

Among the prior art patents which discuss at length aspects of the preparation and properties of organoclays, as above outlined, are U.S. Pat. Nos. 2,531,427; 2,966,506; 3,974,125; 3,537,994; and 4,081,496. Reference may also be had to applicable portions of the standard reference work "Clay Mineralogy," 2nd Edition, 1968, by Ralph E. Grim, McGraw Hill Book Company.

In the usual procedure for preparing an organophilic clay pursuant to this prior art, the smectite-type clay, selected, quaternary compound and water are mixed together, preferably at an elevated temperature, typically in the range of 100° F. to 180° F., for a period of time sufficient for the organic quaternary ammonium compound to coat the clay particles. Thereafter, the product can be filtered, washed, dried and ground, or otherwise processed, depending upon the intended use. In some instances, e.g., the drying and grinding step may be omitted. Various other modifications of this process may be used depending upon the form of product desired—as will be noted in the referenced patents.

SUMMARY OF INVENTION

Now in accordance with the present invention, it has unexpectedly been discovered that the known process for manufacture of an organoclay, wherein a smectite-type clay is reacted with a higher alkyl-containing quaternary ammonium compound, may be improved to yield striking enhancement of the gelling properties of the resultant organoclay product, by subjecting the clay as a pumpable slurry to high speed fluid shear, prior to the said reaction thereof with the ammonium compound.

While we are aware of cursory reference in U.S. Pat. Nos. 4,081,496 and 4,116,866 to use of a pub mill or extruder for shearing an aqueous clay slurry, in order to facilitate a reaction wherein a bentonite-type clay is to be converted to sodium form, by reaction with a soluble sodium compound, we are not aware of any use of high speed fluid shear for treating the clay prior to reaction with a quaternary amine, for improving the gelling properties of the resultant organoclay.

The high speed fluid shear to which the smectite-type clay is subjected in accordance with the process of this invention, is effected by passing the pumpable slurry through a dispersion or colloid mill, which devices are often referred to in the art as "homogenizers." Dispersion and colloid mills are thus well-known in the art, and are succinctly discussed and characterized at pages 8-42 of "Chemical Engineers Handbook," edited by R. H. Perry and C. H. Chilton, 5th Edition, 1973, McGraw Hill Book Company. As is pointed out in this standard reference work, this type of device constitutes a special class of mills normally employed for dispersion and colloidal operations. Such mills operate on a principle of high speed fluid shear. As is stated at page 8-42 of Perry and Chilton: "The principle of their action is to create a fluid stream of high velocity with very great shear forces existing within the fluid, which serve to disrupt the particles." Preferred mills for use in the invention are characterized by including or defining a narrow gap across which a pressure differential is maintained and through which in accordance with the invention the pumpable slurry is passed.

In a preferred mode of practicing the invention, the high speed fluid shear is effected by passing the slurry at high velocities through a narrow gap, across which a high pressure differential is maintained. This type of action, e.g., can be effected in the well-known Manton-Gaulin mill, which device is sometimes referred to as the "Gaulin homogenizer." In the basic operation of such device, a reciprocating, positive displacement piston-type pump is provided with a homogenizing valve assembly which is affixed to the pump discharge. The unhomogenized product enters the valve area at high pressure and low velocity. As is passes through a narrow orifice at the valve, (which is a close-clearance area between the valve and valve seat), its velocity is increased to levels approaching sonic. This provides high shear forces for reduction, and in the said device, these forces are further implemented as this high velocity stream strikes an impact ring where its direction is changed. Of further interest in this connection, is U.S. Pat. No. 3,348,778, to M. I. Cohn et al, which discloses the use of a Manton-Gaulin type arrangement for treating kaolin clays in order to improve the rheology of clay-water systems subsequently formed from same. For present purposes, the patent is of interest in disclosing certain useful arrangements for the said mill, and further details of the construction of same. The patent also discusses the gap provided in the mills of the type disclosed, and properly observes that such gap is only a fraction of an inch, usually of the order of 0.001 to 0.005 inch, but under certain conditions may be as large as 0.09 inch or even 0.1 inch.

In those instances where a gap arrangement, as in the Manton-Gaulin mill, is utilized, the said pressure differential across the gap is preferably in the range of from 1,000 to 8,000 psig with 4,000 to 6,000 psig being more typical in representative operations. Depending upon the specifics of the equipment, pressures higher than 8,000 psig can readily be used.

The said slurry with typically include less than 25% by weight of solids; however, the solids content can vary, and be above the indicated level if appropriate dispersing agents are present. The principal requirement is that the slurry indeed be pumpable, so that it is capable of being subjecting to the aforementioned high speed fluid shear.

In addition to the passage through a narrow gap, as in the aforementioned type Manton-Gaulin mill, the high speed fluid shear can also be effected, pursuant to the invention, by use of dispersion and colloid mills based upon a stator and a closely spaced rotor, wherein a high speed rotation is maintained between the two said elements. The slurry in this instance is subjected to the high speed fluid shear by being passed through the gap between the stator and the rotor. The well-know Greer mill is one example of this type of construction, and may be utilized as one instrumentality in practice of the invention. In the said Greer mill a narrow gap is defined by a stationary stator and a rotor which rotates within the vertically surrounding stator. The slurry to be treated in accordance with the invention is passed through that gap under pressure.

The manner in which the Greer mill functions is further described by the manufacture Greerco Corp., in a 1976 brochure entitled "Greerco Homogenizer Mixers," as follows:

> The Homogenizer Mixer is usually positioned with its inlet at approximately one turbine diameter from the bottom of the tank. In operation, the homogenizer mixer sucks material from the bottom of the tank, through the restricted opening in the inlet plate and into the eye of the patented skewed turbine. The material is subjected to intense impact, multiple changes in flow direction, sudden acceleration and deceleration plus extremely high mechanical and hydraulic shear forces.
>
> The final homogenizing action is obtained as the material passes through the 0.0101" (0.254 mm) gap between the turbine blades and the concave surface of the stator which has multiple precision drilled holes.
>
> The homogenized material exits from the stator at high velocity, travelling upward through the mass, until it strikes the deflector plate which has been positioned just under the fluid surface. Upon striking the deflector plate, the flow direction is instantly turned horizontally toward the walls of the tank. The suggested maximum tank diameter is 9.5-10 times the turbine diameter.
>
> Upon striking the walls of the tank, the fluid flow is re-directed downward, along the tank walls, until the still fast moving flow strikes the tank bottom, where it is turned horizontally to continue forcing unrefined material into the homogenizer mixer inlet. The entire process repeats endlessly until the homogenizer mixer is turned off.

Further instrumentalities useful in effecting high speed fluid shear are discussed in the aforementioned reference to Perry and Chilton.

The smectite-type clays which are subjected to the improved process of this invention, are precisely those which have been conventionally utilized in the prior art in the preparation of organoclays as aforementioned. These are smectite-type clays which have a cation exchange capacity of at least 75 milliequivalents per 100 grams of clay. Useful clays for such purposes include the naturally occurring Wyoming variety of swelling bentonite and similar clays, and hectorite, which is a swelling magnesium-lithium silicate clay. The clays, are preferably converted to the sodium form if they are not already in this form. This can be effected, again as is known in the art, by a cation exchange reaction, or the clay can be converted via an aqueous reaction with a soluble sodium compound.

Smectite-type clays prepared synthetically can also be utilized, such as montomorillonite, bentonite, beidelite, hectorite-saponite, and stevensite.

In a typical procedure pursuant to the invention, the crude smectite-type clay, as for example, a bentonite, is initially dispersed in water at relatively low solids, typically at less than 10% by weight. The slurry is then screened and centrifuged to remove non-clay components and especially abrasive elements such as quartz. Removal of these abrasive elements is especially preferred if the slurry is thereupon to be subjected to a shearing forces as by passing through a narrow gap as in the Manton-Gaulin mill. Were such abrasives present, the orifice channel and attendant portions of the mill would rapidly become damaged.

The fine fraction from the centrifuge, which typically includes 4 to 5% solids, is then subjected to high speed fluid shear in accordance with the invention. Typically, as aforementioned, the said slurry may be passed through a Manton-Gaulin homogenizer in which pressures of 1,000 to 8,000 psig are maintained across the gap, and pressures of 4,000 to 6,000 psig are typical. The output clay product from the high speed fluid shear step is then subjected to the conventional reaction with the quaternary amine.

The reaction of the sheared clay with the amine is effected by the conventional procedures at great length in the prior art, including in the previously mentioned patents.

The organic compounds which are reacted with the sheared clay are quaternary ammonium salts, where the salt anion is preferably chloride or bromide or mixtures thereof; and is more preferably chloride ion. The salt anion may also, however, be nitrate, hydroxyl, acetate, or mixtures of these. Any of such compounds are known to be useful in producing organoclay gellants of the type herein discussed may be used in this aspect of the invention, specifically including the compounds so reported useful in the patents heretofore cited. Among others these include dimethyl di(hydrogenated tallow), dimethyl benzyl hydrogenated tallow, dibenzyl dialkyl, methyl benzyl dialkyl, and trimethyl hydrogenated tallow salts.

Pursuant to the improvements yielded by the invention, the gelling characteristics, i.e., the gelling efficiency of the clays treated by the invention, are so markedly enhanced, as to make possible use of quantities of the gelling agent to achieve a given result, which are reduced in comparison to the amount which would be required in the absence of the invention. Further clays, such as certain deposits of bentonite-type clays which heretofore had been considered unacceptable as crude materials for use in preparing suitable gellants, are found when treated by the process of the invention, to yield organoclay gelling agents which are fully acceptable for use in gelling organic liquids or the like. A net effect of the invention in this regard, is therefore to enable highly effective use of crude deposits previously deemed unusable for these purposes, thereby vastly expanding the possible sources of raw materials which can be used to produce the final gellant products.

BRIEF DESCRIPTION OF THE DRAWINGS

In the drawings appended hereto:

FIG. 5 is a graph of the same character as in FIG. 4, but illustrating comparative data for viscosity measurements of a toluene gel;

FIG. 6 is a further graph illustrating test data for a gelled diesel fuel as in prior Figures, except in this instance a further type of high speed fluid shearing is effected; and FIG. 7 is similar to FIG. 6, but shows the gelling improvement achieved in odorless mineral spirits through use of shearing as in the data for FIG. 6.

DESCRIPTION OF PREFERRED EMBODIMENT

The invention will now be illustrated by a series of Examples, which are intended to set forth typical and preferred procedures to be utilized in practice of the process of the invention.

EXAMPLE 1

In this Example, the smectite-type clay utilized as a starting material was a Wyoming bentonite. The crude bentonite was initially dispersed in water at 7% solids by weight. The slurry was thereon screened, and then centrifuged to remove non-clay components and especially abrasive elements such as quartz. The fine fraction from the centrifuge, which then included approximately 4 to 5% solids by weight, was divided into two portions. One such portion served as a control sample. The second portion, in accordance with the invention, was passed through a Manton-Gaulin homogenizer, wherein pressure of 5,000 psig were maintained across the gap of the said apparatus. The control and the sheared samples, were each divided into further portions, which were reacted with the salt of a dimethyl di (hydrogenated tallow) amine. The ratio of amine to clay was varied in the samples from 85 to 105 milliequivalents per 100 grams of clay on a 100% active clay basis. The amine was stirred into the approximately 4 to 5% solids slurry at 60° C., with stirring being continued for approximately ½ hour, after which the material was filtered, washed with water and dried at 60° C. The dried material was pulverized with a Mikropul mill to approximately 95% less than 200 mesh. Tests were then conducted to determine the gelling properties of each of the control and invention samples.

Figure 1:
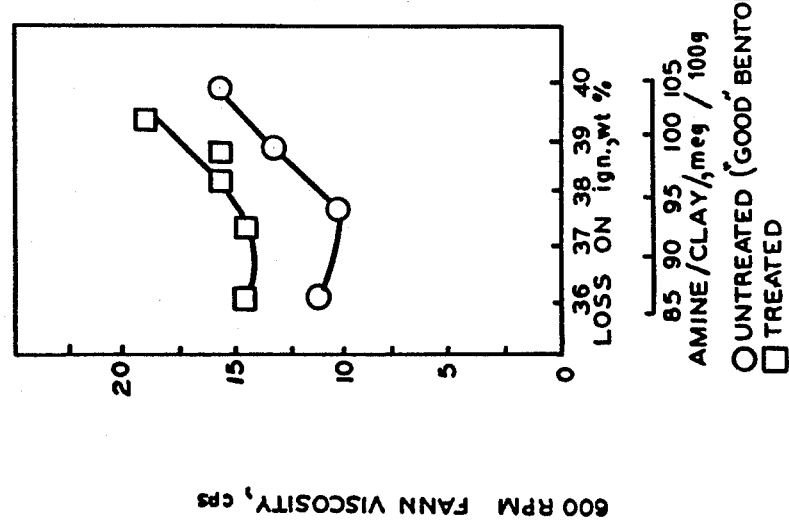
FIG. 1 is a graph comparing the effects of gelling a diesel fuel with an organoclay prepared by the process of the invention, with an organoclay which has been conventionally processed.

In FIG. 1 herein, Fann viscosity in cps is plotted as a function of milliequivalents of the amine added to the clay for the untreated bentonite samples, i.e., the prior art samples, and for the sample treated in accordance with the invention. (Loss on ignition is also plotted as abscissa, which is a measure of the organics combined with the clay.) The type of bentonite utilized in this example is considered by those skilled in the art to be relatively "good" for use in preparing organoclay gellants. Viscosity measurements were effected by measuring a quantity of diesel oil into a multi-mixer can. In each instance, the sample to be evaluated was added to the diesel oil with stirring, from the mixer, and placed on the Fann viscometer, and the 600 and 300 rpm readings obtained. Gel readings were obtained after 10 seconds. It will be apparent that a vast improvement in viscosity of the gelled diesel fuel is evidenced across all ranges of the amine-to-clay ratio where the method of the invention is used.

The precise manner in which the high speed fluid shear functions to produce the striking improvements in gelling properties is not fully understood. Among other things, however, the effect of the Manton-Gaulin mill on particle size characteristics of the bentonite samples, has been evaluated independently of the processing of the present Examples. In one such instance, the feed particles average size was thus 0.756 microns. It was found that where the energy input to the Manton-Gaulin mill was 210 horsepower hours per ton of clay, the average particle size was reduced to 0.438 microns. In a second instance where the input particle size was the same, 0.756 microns, and the energy input 700 horsepower hours per ton of clay, the average particle size was reduced to 0.352 microns. This data indicates a very substantial average particle size reduction is one consequence of the passage through such mill. It also, however, is clear that there is a diminishing return in this respect, as the amount of energy is increased. The particle sizes are weight average particle size of the bentonite dispersed in water, as measured on a "Nanosizer" particle size machine (marketed by Coulter), which measures the Brownian motion of the particles suspended in the water by scattering laster light from same.

EXAMPLE II

Figure 2:
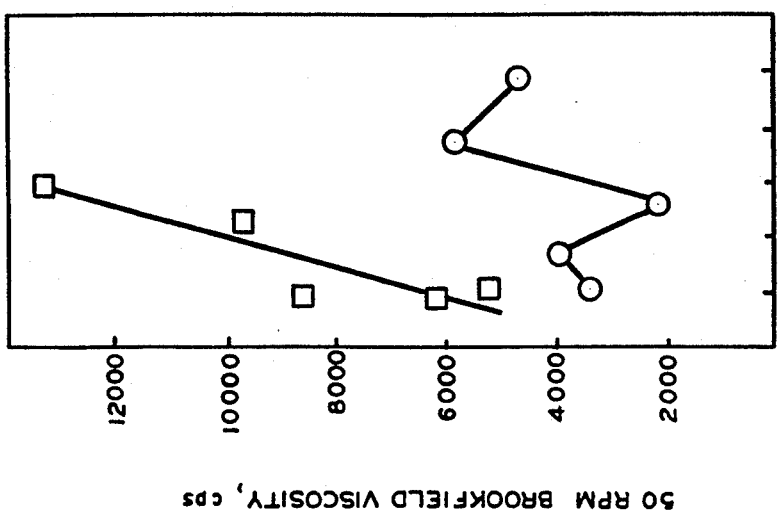
FIG. 2 is a graph similar to FIG. 1 and illustrating the comparative results achieved where an organoclay in accordance with the invention, and a control untreated organoclay, are each used in the gelling of odorless mineral spirits.

In this instance, the same procedure was utilized as in Example I, except that the effect of the invention on the gellant were evaluated by admixing same with odorless mineral spirits (OMS). In the said procedure, a fixed quality of the odorless mineral spirits were transferred to a container and the temperature is established for same. A small quantity of 100% propylene carbonate was added to the mixture, while stirring. Next, a specified quantity of the sample to be evaluated was transferred to the container, followed by vigorous stirring. The mixture was blunged with a Cowles blade for two minutes and the gel stirred for 10 revolutions with a spatula. The container was covered and the gel allowed to remain in a constant temperature bath at 24° C., + or −1° C., for two hours, after which the gel viscosity was measured on a Brookfield viscometer. The resulting data is plotted in FIG. 2, and establishes even a more remarkable difference between the treated and untreated organoclays with respect to their ability to gel the said odorless mineral spirits.

EXAMPLE III

Figure 3:
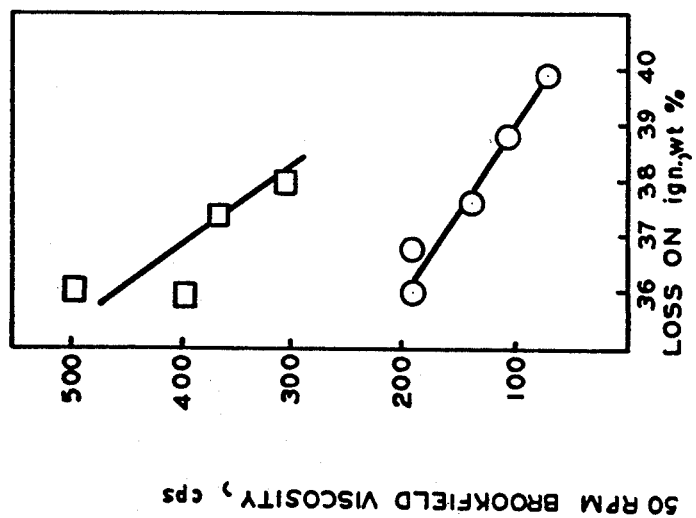
FIG. 3 is a further graph similar to the foregoing graphs, and illustrating comparable data for a toluene gel.

In FIG. 3, the same material as in Examples I and II, resulting from the present invention is evaluated for its gelling characteristics in toluene. In this procedure, 6 grams of the organoclay was admixed with 340 ml of toluene by use of a Waring blender. 2.3 ml of a polar dispersant was then added, consisting of 95% by weight methanol and 5% by weight of deionized water, and additional blending carried out. (In general, small proportions of polar compounds may be added to develop maximum viscosity. Typical polar activators are water, methanol, and propylene carbonate.) The contents were then poured into a container, allowing the gel to flow very thinly over the container lip, thus allowing any air bubbles to escape. The container was maintained in a water bath at 74° F., + or −1° F., for two hours, after which Brookfield viscosity readings were obtained. Once again, FIG. 3 illustrates the striking improvements yielded by practice of the invention.

EXAMPLE IV

Figure 4:
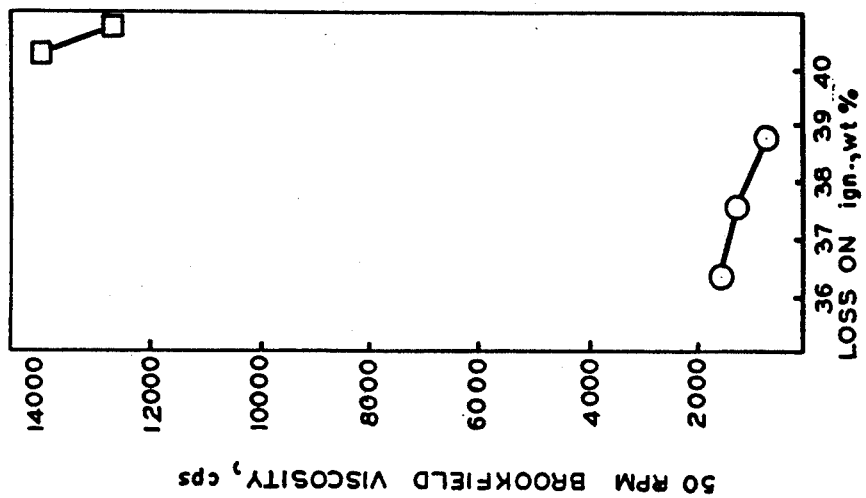
FIG. 4 is a further graph of the same character as the prior graphs, illustrating gelling effects in a further odorless mineral spirits, where the starting crude clay is of relatively poor quality.

In this Example, the same procedure was utilized as in Example I for purposes of preparing the modified bentonite, except the bentonite sample utilized herein differed from that in Example I in being a crude of a type normally regarded as "poor" for producing an organoclay gelling agent. The same procedures as aforementioned were used in treating odorless mineral spirits. The data yielded is set forth in FIG. 4. It is clear that the process of the invention has yielded a remarkable increase in gelling capacity for the mineral treated by the invention. Indeed, as mentioned, the said bentonite crude would, where processed by conventional techniques, be regarded as an unacceptable gellant, whereas the organoclay yielded by the process of the invention is a completely acceptable product.

EXAMPLE V

In this Example, a further so-called "poor" bentonite was processed in accordance with the invention and in accordance with prior art, and the effects upon gelling of toluene were established by the procedures of Examples III. The graphical showing to FIG. 5 illustrates the same consequences, as discussed for Example IV; i.e., that by the process of the invention, a remarkable improvement in the gelling properties of an otherwise poor bentonite have been achieved, resulting in a highly usable material in place of a material which heretofore was unacceptable for preparation or organoclays intended for use as gelling agents.

EXAMPLE VI

In this Example, samples of a further refined bentonite slurry which was initially processed as described in connection with Example I, was subjected to high speed fluid shear by being passed through a Greer mixer, which is a well-known dispersion mill of the rotor/stator type. In this procedure, the slurry was mixed with the Greer for a minimum of 5 minutes at maximum speed, 8,500 rpm. Directly after mixing, the amine was added in the normal manner. The comparative data yielded depicts gelling effects in a diesel fuel for samples treated by the invention, vis-a-vis samples conventional processed. These show a good improvement where the process of the invention is utilized, although the improvement is not so marked as that yielded where the Manton-Gaulin type of mill is used.

EXAMPLE VII

In this Example, the procedure described in Example VI was followed, except that the resulting samples were evaluated for use in gelling odorless mineral spirits. The resultant data is set forth in FIG. 6. Again, it is seen that the process of the invention results in marked improvements, although these again are not so striking as those yielded where the slurry is passed through the Manton-Gaulin type of processing.

Passage of the clay slurry through a narrow pressurized gap in accordance with the invention yields results that differ fundamentally from what occurs where a conventional blade or disc-type mixer such as a Waring Blender or a Cowles disperser is utilized. This can be appreciated by comparing the shearing mechanisms imposed upon a fluid in a Cowles high speed disperser with those imposed by the Manton-Gaulin mill.

In the Cowles high speed dissolver shear is imposed upon a fluid by smashing actions of the blades (mechanical energy) and by smearing arising from laminar flow. Of the two, the smearing mechanism is the more important, and the efficiency of dispersion is determined by the stirring design configuration (RPM, blade size, container size and shape). Swirling, turbulent flow creates efficient mixing but most significantly, intermingled pockets remain undispersed. Conversely, the laminar flow pattern may fail to provide efficient mixing, but the drag of layers over each other tears any clumps of particles apart, and efficient dispersion is obtained. Additionally, the more viscous the fluid, the more effective is the tearing, and the efficiency of the Cowles disperser increases with increasing viscosity.

In contrast, the Manton-Gaulin mill allows the product to enter an expansion valve at a very high pressure and low velocity. As the product enters the close clearance area between the valve and the valve seat, there is a rapid increase in velocity to the order of 30,000 cm/sec with a corresponding decrease in pressure arising from the Bernoulli effect. This allows the formation of bubbles which implode with extreme energy as the product velocity decreases upon leaving the valve seat area. This promotes the creation of shock waves which induce shearing by collision; this process is known as cavitation. In contrast to the behaviour of the Cowles apparatus, the efficiency of the Manton-Gaulin mill decreases with increasing viscosity arising from rapid dissipation of shear waves.

It can be shown that the shear stress in a typical Cowles dissolves is approximately 2013 dynes/cm$^2$. (This assumes a fluid density of 1.0 g/cm$^3$ and a circular rim blade velocity of 4,000 ft/min (2,000 cm/sec) for a dissolver with a 4 inch blade.

Although the Manton-Gaulin mill does not employ laminar flow as a shearing mechanism, assuming a laminar model may give an upper bound to the shear rate and shear stresses encountered upon cavitation. Because of the extreme pressure shearing of the order of magnitude of laminar stress may be encountered.

Assuming this and a reasonable distance between the valve and valve seat (100 microns) a shear rate may be estimated from manufacturer specifications as about $2.9 \times 10^6$ sec$^{-1}$. The shear stress can then be shown to be $8.8 \times 10$ dynes cm$^{-2}$.

From the foregoing it may be concluded that the following differences exist between the Cowles and Manton-Gaulin devices:

1. The Manton-Gaulin mill operates on the principle of cavitation involving extremely high particle velocities and turbulent flow. The Cowles apparatus operates at low shear rates with efficient dispersion arising from laminar flow.

2. The efficiency of the Cowles disperser increases with increasing viscosity; that of the Gaulin apparatus decreases.

3. Clay particles in suspension experience much higher shear stresses and shear rates in the Gaulin apparatus, although these are not amenable to direct calculation.

4. In order to compare the total shear exerted upon a clay slurry per unit area, time integrals must be compared. Assuming the Gaulin apparatus has a pump stroke of 1,800 RPM (0.03 sec/stroke) the total shear time values can be estimated, and indicate that a 35 minute shear in the Cowles device typically equates to one pump stroke on the Manton-Gaulin apparatus insofar as total shear is concerned.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. In a process for manufacture of an organoclay by reacting a smectite-type clay with a higher alkyl-containing quaternary ammonium compound; the improvement enabling enhancement of the gelling properties of said clay, comprising:

subjecting the clay as a pumpable slurry, to high speed fluid shear in a dispersion mill, prior to the said reaction thereof with said ammonium compound, by passing said slurry through a narrow gap across which a pressure differential is maintained, said narrow gap being defined between a rotor and a closely spaced stator which vertically surrounds the rotor; said rotor being rotated at a high speed with respect to said stator, and said slurry being subjected to said shearing forces in at least the said narrow gap between said stator and rotor.

2. A method in accordance with claim 1, wherein said stator and rotor have a gap of about 0.01 inches.

* * * * *